(12) United States Patent
Baladhandapani et al.

(10) Patent No.: US 11,625,037 B2
(45) Date of Patent: Apr. 11, 2023

(54) METHODS AND SYSTEMS FOR SEARCHLIGHT CONTROL FOR AERIAL VEHICLES

(71) Applicant: HONEYWELL INTERNATIONAL INC., Morris Plains, NJ (US)

(72) Inventors: Gobinathan Baladhandapani, Madurai (IN); Hariharan Saptharishi, Madurai (IN); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 240 days.

(21) Appl. No.: 16/867,099

(22) Filed: May 5, 2020

(65) Prior Publication Data

US 2021/0255625 A1   Aug. 19, 2021

(30) Foreign Application Priority Data

Feb. 13, 2020   (IN) .............................. 202011006205

(51) Int. Cl.
*G05D 1/00* (2006.01)
*B64C 39/02* (2006.01)
*H04N 5/225* (2006.01)
*H04N 5/232* (2006.01)
*G10L 15/22* (2006.01)
(Continued)

(52) U.S. Cl.
CPC ......... *G05D 1/0094* (2013.01); *B64C 39/024* (2013.01); *G05D 1/0016* (2013.01); *G05D 1/0044* (2013.01); *G06F 3/012* (2013.01); *G06F 3/013* (2013.01); *G06F 3/017* (2013.01); *G06T 11/00* (2013.01); *G10L 15/22* (2013.01); *H04N 5/2256* (2013.01); *H04N 5/23203* (2013.01); *H04N 5/23299* (2018.08); *B64C 2201/146* (2013.01); *G10L 2015/223* (2013.01)

(58) Field of Classification Search
None
See application file for complete search history.

(56) References Cited

U.S. PATENT DOCUMENTS

| 5,589,901 A | 12/1996 | Means |
| 6,962,423 B2 | 11/2005 | Hamilton et al. |
| 7,675,248 B2 | 3/2010 | Mubaslat et al. |

(Continued)

FOREIGN PATENT DOCUMENTS

| EP | 3072817 A1 | 9/2016 |
| JP | 2013175909 A | 9/2013 |

(Continued)

*Primary Examiner* — Talha M Nawaz
(74) *Attorney, Agent, or Firm* — Lorenz & Kopf, LLP

(57) ABSTRACT

Systems and methods described herein provide one or more processors configured to execute program instructions to cause the one or more processors to receive camera images of a scene including a portion being lit by the searchlight, receive terrain data from a terrain database, generate an augmented/virtual reality scene based on the camera images and the terrain data, display, via a headset display, the augmented/virtual reality scene, track gaze and head movement using headset sensors, output tracking data based on tracked gaze and head movement, and output instructions for controlling at least one function of the searchlight based on the tracking data.

18 Claims, 2 Drawing Sheets

(51) Int. Cl.
    *G06F 3/01*     (2006.01)
    *G06T 11/00*     (2006.01)

(56) References Cited

U.S. PATENT DOCUMENTS

| | | | |
|---|---|---|---|
| 8,488,841 B2 | 7/2013 | Lee | |
| 10,698,481 B1* | 6/2020 | Najafi Shoushtari | G06V 40/19 |
| 10,979,685 B1* | 4/2021 | Silverstein | H04N 13/117 |
| 2010/0045666 A1 | 2/2010 | Kornmann et al. | |
| 2012/0206050 A1 | 8/2012 | Spero | |
| 2013/0127980 A1 | 5/2013 | Haddick et al. | |
| 2016/0327950 A1 | 11/2016 | Bachrach et al. | |
| 2017/0374276 A1 | 12/2017 | Veeramani et al. | |
| 2018/0053284 A1* | 2/2018 | Rodriguez | G06F 3/14 |
| 2018/0136642 A1 | 5/2018 | Tian et al. | |
| 2018/0217249 A1* | 8/2018 | La Salla | G06V 40/161 |
| 2019/0107845 A1* | 4/2019 | Kaine | G05D 1/104 |
| 2019/0332931 A1* | 10/2019 | Montantes | G06F 3/0304 |
| 2020/0191946 A1* | 6/2020 | Kalyan | G01S 13/955 |
| 2021/0088784 A1* | 3/2021 | Whitmire | G06F 3/013 |
| 2021/0089124 A1* | 3/2021 | Manju | G06F 3/167 |
| 2021/0255625 A1* | 8/2021 | Baladhandapani | G06F 3/013 |
| 2022/0180756 A1* | 6/2022 | Baladhandapani | B64D 45/00 |

FOREIGN PATENT DOCUMENTS

| | | |
|---|---|---|
| KR | 101621876 B1 | 5/2016 |
| KR | 20170090888 A | 8/2017 |

\* cited by examiner

METHODS AND SYSTEMS FOR SEARCHLIGHT CONTROL FOR AERIAL VEHICLES

CROSS REFERENCE TO RELATED APPLICATION

The present application claims benefit of prior filed Indian Provisional Patent Application No. 202011006205, filed Feb. 13, 2020, which is hereby incorporated by reference herein in its entirety.

TECHNICAL FIELD

The present disclosure generally relates to controlling searchlights for aerial vehicles.

BACKGROUND

Search and Rescue (SAR) operations are often performed using aircraft with specialized rescue teams and equipment to assist people in real or likely distress. These include mountain rescue, ground search and rescue, air-sea rescue, etc. Generally, rotary wing or fixed wing aircraft are used for aerial SAR operations.

Systems like InfraRed (IR) cameras and Forward Looking IR Radar (FLIR), which detect thermal radiation, and night vision goggles are used in performing SAR during night operations.

The night search and rescue is a challenging task. Either the On Scene Coordinator (OSC) or the pilot will have considerable workload when performing SAR operations during night time. Among multiple factors that govern the effectiveness of SAR during night time, illumination from search, navigation and other lights play a considerable role.

Operations performed by the coordinator include stow, deploy, filter change, zoom, searchlight dim along with pointing-scanning and coordinating. Available systems include hand grip controllers, searchlight control panels and filter selectors that interface with a searchlight to carry out these activities. Such interfaces with the searchlight are quite cumbersome and put a considerable amount of load on the person conducting the search. Existing hand grip controllers limit a degree of freedom of movement of a search coordinator or pilot, which can limit the effectiveness of the search operation.

Accordingly, it is desirable to provide methods and systems to improve user interfaces with search and rescue equipment including searchlight control. In addition, it is desirable to provide user interfaces that allow a user to wholly focus on the search tasks and to minimize distraction of how to operate control interfaces. Furthermore, it is desired to reduce workload of a person conducting search operations and to facilitate focus on executing the mission. Furthermore, other desirable features and characteristics will become apparent from the subsequent detailed description and the appended claims, taken in conjunction with the accompanying drawings and the foregoing technical field and background.

BRIEF SUMMARY

Systems and methods described herein provide one or more processors configured to execute program instructions to cause the one or more processors to receive camera images of a scene including a portion being lit by a searchlight, receive terrain data from a terrain database, generate an augmented/virtual reality scene based on the camera images and the terrain data, display, via a headset display, the augmented/virtual reality scene, track gaze and head movement using headset sensors, output tracking data based on tracked gaze and head movement, and output instructions for controlling at least one function of the searchlight based on the tracking data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
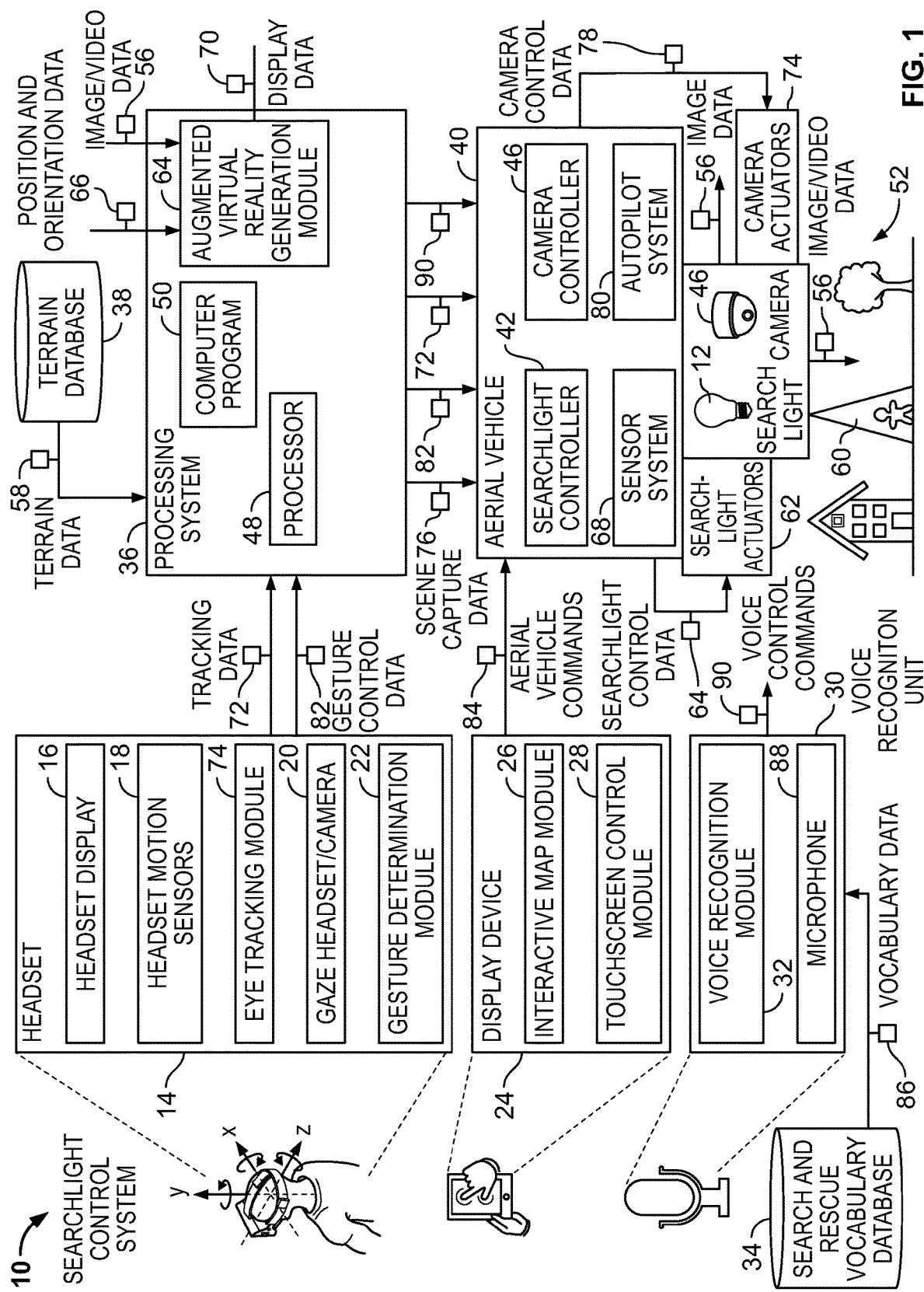
FIG. 1 illustrates a block diagram of a searchlight control system, in accordance with embodiments of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and/or modules, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components and modules shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments or programming instructions are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Disclosed herein is a searchlight control system offering improvements in searchlight technology. The present disclosure proposes usage of multimodal interactions with the searchlight to provide superior performance and increase overall mission efficiency. The disclosed searchlight control system is interfaced with multimodal control interactions, which can lead to more autonomous mission operations and reduce previous laborious steps for a pilot or mission coordinator. The present disclosure describes a head mounted display that displays a search scene captured by a camera mounted to an aerial vehicle, processes the captured images to provide an augmented or virtual reality display and utilizes gaze tracking as one input for controlling a searchlight. In embodiments, additional inputs include speech recognition for controlling at least one function of the searchlight.

Systems and methods described herein reduce the load of a person conducting search operations and facilitate focus on executing the mission. The searchlight control system enables a searchlight connected with multiple modalities to improve accessibility and efficiency of the search mission. The multiple modalities include voice and/or gesture control in conjunction with an augmented display that will aid the coordinator in accomplishing the mission with ease. The herein described searchlight control system allows a greater degree of freedom of movement for an on-scene coordinator, improved focus on mission aspects, enhanced situational awareness and facilitates quick decision making.

Referring to FIG. 1, remote video from a camera 46 mounted to an aerial vehicle 40 is streamed to a headset 14 including a headset display 16 via an augmented/virtual reality generation module 64 that includes registered synthetic features in a display. Headset motion sensors 18 and a headset gaze camera 20 allow gaze and head tracking data 72 to be determined, which represents where a search coordinator is looking in the augmented scene. Searchlight controller 42 is responsive to the gaze and head tracking data 72 to control searchlight 12 (e.g. by changing focus and/or changing beam direction) to provide required additional illumination at a location in real space corresponding to where the coordinator is detected to be looking in image space. Thus, headset 14 is configured to detect a gaze area of the coordinator and perform gaze slaving to adjust a direction of beam 60 from searchlight to the area for better illumination. Further, a perspective immersive view is generated in headset display 16 using augmented reality to enhance search operation. Augmented/virtual reality generation module 64 is configured to augment live video using registered synthetic terrain features based on terrain data 58 from a terrain database 38. Further, augmented/virtual reality generation module 64 is configured to perform object recognition (using other database sources) and augmentation object tracking (based on coordinator voice or gesture command).

In embodiments, searchlight control system 10 additionally includes voice recognition unit 30 to provide a further mode of input for the searchlight control system. Having a voice activated search light allows greater degree of freedom of movement of a searchlight coordinator. Microphone 88 of headset 14 is either wirelessly or connected directly to voice recognition module 32 or a separate microphone 88 is provided. Voice recognition module 32 is trained for a list of possible search and rescue vocabulary. This vocabulary includes search light movement commands (such as turn, tilt, move, rotate), searchlight property commands (such as increase/reduce brightness, focus, slave to camera), filter selection commands and tracking commands (such as track object (human/vehicle) in focus, record). In some embodiments, gaze slaving control for direction of searchlight 12 is combined with voice activated control of other searchlight features like searchlight property commands, filter selection and/or tracking commands. Voice recognition module 30 generates voice control commands 90 for the given speech command and searchlight controller 42 is configured to react to voice control commands 90 to control searchlight 12.

In embodiments, searchlight control system 10 includes a display device 24 as an additional control input. Display device 24 is configured to display output from camera 46 remotely in a monitor/handheld system like a tablet. Display device 24 is configured to allow synchronous operation of viewing and searching in poor weather/visibility conditions. That is, live images of the camera 46 can be viewed and touchscreen controls can be used to adjust searchlight functions (like beam direction, searchlight property, filter selection and tacking). In this way, a control-on-the-go process is provided by which a searchlight 12 can be adjusted while viewing the scene 52. In embodiments, a current state/orientation of the searchlight 12 is sent from searchlight controller 12 to display device 24. The view stream is coupled with a touchscreen interface provided for the coordinator to re-direct the searchlight 12 and includes a set of soft switches to change the orientation of the searchlight 12 and change the light parameters by sending corresponding commands to the searchlight controller 12. Control of the searchlight 12 may be passed between headset 14 and display device 24 based on mode selections and may be distributed between them so that some searchlight functions are controlled by headset 14 and some by display device 24. Display device 24 can also work in conjunction with voice activated searchlight 12, wherein the coordinator can use voice to control some searchlight functions (e.g. tracking) and some searchlight functions are controlled through display device 24 (e.g. searchlight property) and some searchlight functions are controlled through headset 14 (e.g. gaze slaved beam direction). In embodiments, display device 24 includes an interactive map module 26 providing a graphical map allowing touch control to select areas of interest and to generate searchlight and/or aerial vehicle commands to move the aerial vehicle 40 and the searchlight 12 to the area of interest through autopilot system 80 and searchlight controller 42. In some embodiments, interactive map is displayed in augmented/virtual reality world of headset 14 and similar area of interest selection can be made by gesture control which is detected by gesture determination module 22.

Having summarized in the foregoing overall functions of searchlight control system 10, more detailed information will now be provided with reference to FIG. 1. FIG. 1 illustrates a searchlight control system 10 that includes a searchlight 12, a headset 14 including headset motion sensors 18 and a processing system 36 including at least one processor 48 configured to execute instruction of a computer program 50. According to the computer program instructions, the processing system 36 is configured to receive image data 56 from a camera 46 (e.g. video data from camera 46) of a search scene 52 including a portion being lit by a beam of searchlight 12. Camera 46 and searchlight 12 are mounted to an aerial vehicle 40. Camera 46 and searchlight 12 are useful in a search and rescue mission or other mission in which searchlight 12 needs to be accurately controlled in order to improve visibility and identify a ground target. Aerial vehicle 40 is, in some embodiments, a rotor craft such as a helicopter and other types of Vertical Take-Off and Landing (VTOL) aerial vehicle. Manned or unmanned aerial vehicles have application according to the present disclosure. Searchlight 12 is, in one embodiment, an apparatus that combines an extremely bright source (e.g. at least 10,000 lumens) with a mirrored parabolic reflector to project a powerful beam of light of approximately parallel rays in a particular direction. Searchlight 12 is configured to allow swiveling so as to direct the beam 60 to different positions on the ground. Multi-axis swiveling is possible and is effected through searchlight actuators 62 such as electromotors under control based on searchlight control data 64 from searchlight controller 42.

In embodiments, camera 46 includes one or more cameras that operate (primarily) in the visible spectrum or in the infrared spectrum or a combination thereof. In embodiments, camera 46 is part of an Enhanced Vision System (EVS). An EVS camera is an airborne system that captures a forward-looking scene so as to provide a display that is better than unaided human vision. EVS camera includes imaging sensors (one or more) such as a color camera and an infrared camera or radar. EVS camera includes, in embodiments, a millimeter wave radar (MMW) based imaging device, a visible low light television camera, one or more InfraRed cameras (possibly including more than one infrared camera operating at differing infrared wavelength ranges) and any combination thereof to allow sufficient imaging in poor visibility conditions (e.g. because of night time operation or because of inclement weather).

The processing system 36 is configured to receive terrain data 58 from a terrain database 38. Terrain database 38 includes data elements describing ground terrain and some buildings. Thus, slopes, hills, mountains, buildings and even trees can be described in terrain database 38. Terrain database 38 allows terrain features to be included in displays generated by processing system 36, particularly three-dimensional perspective displays provided through headset display 16 of headset 14.

The processing system 36 is configured, via augmented/virtual reality generation module 64, to generate an augmented/virtual reality scene based on image data 56 from camera 46 and terrain data 58 from the terrain database 38. Other synthetic feature data sources in addition to camera 46 and terrain database 58 can be provided. In embodiments, augmented/virtual reality generation module 64 is configured to receive at least image data 56 from camera 46, position and orientation data 66 and terrain data 58. Position and orientation data 66 defines position and orientation of camera 46 and camera parameters in order to be able to localize the scene 52 being viewed by the camera 46. Position and orientation data 66 is generated based on global positioning and orientation data obtained from sensor system 68 of aerial vehicle 40. Sensor system 68 includes a global positioning receiver that determines position of aerial vehicle 40 based on satellite signals received from at least three satellites. Further, sensor system 68 includes an Inertial Measurement Unit (IMU) to allow orientation of the aerial vehicle (yaw, pitch and roll) to be determined. Yet further, sensor system 68 includes sensors (optionally associated with searchlight actuators 62) to allow relative orientation and position of camera and aerial vehicle 40 to be determined. Other camera parameters including zoom level may be determined in sensor system 68. The position and orientation data 66 from sensor system 68 is fused by augmented/virtual reality generation module to precisely localize the scene being captured by the camera 46 in real word space.

Position and orientation data 66 can be used to positionally register synthetic terrain features defined in terrain data 58 (and optionally other synthetic features from other data sources) using known transformation functions between real space and image space, thereby generating an augmented or virtual reality scene. Augmented/virtual reality generation module 64 is configured to generate display data 70 representing the generated augmented/virtual reality scene. Thus, a live feed from camera 46 is perfectly registered via position and orientation data 66 on top of a 3-D graphical view of the terrain (and possibly other synthetic features), creating a blended image that gives pilots and search coordinators enhanced situational awareness. Augmented reality adds digital elements from terrain database 38 and other data sources to a live view from camera 46. Virtual reality implies a complete immersion experience such that live view from camera 46 is wholly replaced by corresponding synthetic features. A virtual reality view may be intermittent to allow an operative greater visibility when orienting in the search scene 52 before reverting to augmented reality to locate a potential target in the scene 52.

The headset display 16 of headset 14 is configured to display the virtual/augmented reality scene based on the display data 70 generated by augmented/virtual reality generation module 64. Headset display 16 includes a stereoscopic head-mounted display that provides separate images for each eye.

Headset 14 includes headset motion sensors 18 configured to track head movement. Headset motion sensors 18 include an IMU including one or more accelerometers and gyroscopes to allow position and orientation (yaw, pitch and roll) of the head to be calculated. In some embodiments, headset 14 includes an outwardly facing headset camera (not shown) or a cluster of ranging devices to allow for highly accurate determination of position and orientation of headset 14 through Simultaneous Localization And Mapping (SLAM) techniques. Headset motion sensors 18 are configured to output position and orientation data as part of gaze and head tracking data 72. In some embodiments, headset 14 includes one or more inwardly facing headset gaze cameras 20 to allow eye gaze of a wearer to be tracked according to known techniques. Headset 14 includes an eye tracking module that receives images of the eyes from headset gaze camera (s) 20 and outputs an eye tracking vector as part of gaze and head tracking data 72. Accordingly, headset 14 is configured to generate gaze and head movement tracking data 72 that is used to control a variety of features of searchlight control system 10.

Searchlight control system 10 includes a searchlight controller 42 that is configured to output searchlight control data 64 for controlling at least one function of the searchlight 12 based on the gaze and head movement tracking data 72. In embodiments, eye tracking vector (which is part of gaze and head movement tracking data 72) includes data concerning a gaze point, fixations, amongst other gaze metrics. In embodiments, searchlight controller 12 is configured to gaze slave movement of the searchlight 12 and to gaze slave control movement of the searchlight 12 through searchlight actuators 62 and searchlight control data 64. That is, searchlight controller 12 is configured to determine a point or area of interest according to the gaze of the wearer of the headset 14 as defined in the gaze vector, to transform that point or area of interest in image space into real word space (using an inverse of a similar transform to that described above with respect to augmented/virtual reality generation module 64) and to generate searchlight control data 64 accordingly. In some embodiments, gaze and head movement tracking data 72 is utilized by augmented/virtual reality generation module 64 to execute foveated rendering by rendering parts of the scene 52 that a wearer is looking at in higher resolution than peripheral parts.

In accordance with various embodiments, position and orientation data representing head movements of a user are output from headset 14 as part of gaze and head movement tracking data 72, which is used as a control input for augmented/virtual reality control module 64. Specifically, as the head orientation moves (e.g. pitch, roll and/or yaw), this movement is captured in gaze and head movement tracking data 72 and part of the scene 52 that is displayed should be updated accordingly. Augmented/virtual reality generation module 64 is configured to generate display data 70 to show part of the scene 52 according to head movements of a wearer of headset 14 (as defined in gaze and head movement tracking data 72). This tracking of head movement to the part of scene 52 to be displayed is determined based on a transform of a view of the wearer in image space (which is known from headset display parameters and orientation of headset 14 included in gaze and head movement tracking data 72) into real word space of the scene 52 (which is known based on position and orientation data 56 including global position of aerial vehicle 40, orientation of aerial vehicle 40, orientation of camera 46 and other parameters) and the augmented/virtual reality generation module 64 generates image data 70 spatially corresponding to the required part of the scene 52. When head movement indicated by gaze and head movement tracking data 72 is outside of current field of view of camera 46, processing system 36 is configured to generate scene capture data 76 defining an area of scene 52 that is to be captured (e.g. a defined geographical area). Based on scene capture data 76, camera controller 46 of aerial vehicle 40 is configured to generate camera control data 78, which is used by camera actuators 74 to capture the area of scene 52 defined by scene capture data 76.

In some embodiments, searchlight control data 64 and/or camera control data 78 is useful for automatically controlling though an autopilot system 80 a position of the aerial vehicle 40 as well as, or alternatively to, utilizing searchlight actuators 62 and/or camera actuators 74 to control position and orientation of searchlight 12 and/or to control position and orientation of camera 46.

The present disclosure provides a searchlight control system 10 that allows a wearer of headset 14 to control direction and orientation of beam 60 by where the wearer is looking in a display of scene shown on headset display 18. An augmented or virtual reality view is provided through headset display 16 that allows the wearer to be fully immersed in the search mission and to intuitively control the beam of the searchlight 12. Further, which parts of scene 52 are being viewed is controlled by head movement (and optionally additionally eye tracking), which can be used to control aim of camera 46. Thus, the scene 52 is more clearly viewed and the searchlight 64 can be more effectively controlled than with prior art control systems.

Searchlight 12 is controlled by additional control inputs to gaze slaving, in accordance with various embodiments. In embodiments, headset 14 includes a gesture determination module 22 configured to determine hand gestures of a wearer of headset 14. In some embodiments, searchlight control system 14 includes hand controllers (not shown) that have light emitting devices to that allow gesture determination module 22 to determine position and orientation of the hands through constellation tracking methods. In other embodiments, hand controllers are not required and headset 14 includes a camera (not shown) for imaging the hands of the wearer. The gesture determination module 22 is configured to analyze the imaging of the hands of the wearer to determine hand gestures and to correspondingly provide gesture control data 82 that is processed by processing system 36 and used by processing system 36 and searchlight controller 42 to determine searchlight control data 64 for controlling one or more features of searchlight 12. For example, gestures may be defined by gesture determination module for selecting operating parameters of searchlight 12 such as filter or focus. In other embodiments, gaze control mode may be exited and gesture control mode may be entered such that direction of beam 60 is controlled through gesture control. Gesture control data 82 may be used to control display by headset display 16. For example, a zoom function may be invoked by gesture control, which can be performed via a zoom of camera 46 or through image processing by augmented/virtual reality generation module 64. In some embodiments, a field of view shown by headset display 16 is controlled by a combination of gestures and head movements whereby coarse control is achieved through gestures (e.g. by gesture selecting a particular part of a currently displayed scene such as a floor of a building) with head movements providing detailed control of which part of the scene is centrally displayed. Alternatively, head motion control mode can be exited and a gesture control mode can be entered in which field of view in headset display 16 is controlled primarily through gesture control.

In accordance with various embodiments, searchlight control system 10 includes a display device 24 including an interactive map module 26 and a touchscreen control module 28. Interactive map module 26 is configured to generate an interactive map of the search scene and to synchronously display live images from camera 46. Although display device 24 is shown as a separate display in FIG. 1, display device 24 can, in some embodiments, be headset display 16. That is, wearer of headset display can select an interactive map mode (e.g. through hand gestures and selectable options displayed through headset display 16) to synchronously show live images or augmented/virtual reality live images and an interactive map. In either implementation, interactive map will cover a greater area than live images shown on display device 24. Display device 24 includes a touchscreen control module 28 configured to receive touchscreen inputs through display device 24 on interactive map and to output corresponding aerial vehicle commands 84. Autopilot system 80 of aerial vehicle 40 is configured to respond to aerial vehicle commands 84 to relocate aerial vehicle to a position selected on interactive map. A similar function can be performed when interactive map is generated on headset display 16, with selection of an area of interactive map being performed through gesture control. Touchscreen control module 28 is further configured to receive touchscreen inputs associated with displayed live images to perform fine adjustment on position and orientation of searchlight 12 and other searchlight functions (such as focus and filters). In some embodiments, display device 24 and headset display 16 operate in parallel whereby a headset control mode is exited and a touchscreen control mode is entered such that searchlight 12 is primarily controlled through display device 24 (including coarse interactive map touch searchlight control and fine live images searchlight control).

In accordance with various embodiments, searchlight control system 10 includes a voice recognition unit 30 including a microphone 88 and a voice recognition module 32. Microphone can be included in headset 14 or provided as a separate device. Voice recognition module 32 is configured to process audio data received from microphone 88 to recognize vocabulary for which the voice recognition module 32 is trained or otherwise specially configured using known speech recognition algorithms. In some embodiments, vocabulary data 86 is received from vocabulary database 34 such as a search and rescue focused vocabulary database 34. Voice recognition module 32 is configured to process the audio data to identify any of a list of vocabulary in vocabulary data 86 and to output corresponding voice control commands 90 to searchlight controller 42. Searchlight controller 42 is responsive to voice control commands 90 to control at least one function of the searchlight 12 including direction of beam 60, filter, focus and other functions. Exemplary voice commands to be included in vocabulary data 86 include any one or a combination of:

Searchlight movement commands
such as Turn, Tilt, Move, Rotate
Searchlight property commands
such as Increase/reduce brightness, Focus, Slave to camera
Filter selection Commands
such as Select Filter
Tracking commands
such as Track object (Human/vehicle) in focus, Record In embodiments, voice recognition unit 30 is configured to receive voice commands relating to display shown by headset display 16 including zoom and camera aiming functions, which can be executed through augmented/virtual reality generation module 64 or through camera controller 46.

In embodiments, voice control through voice recognition unit 30 is used in association with gaze and head movement controls of headset 14. That is, some functions of searchlight 12 are controlled through voice control commands 90 and some functions are controlled through gaze and head tracking data 72. For example, movement of beam 60 is controlled based on gaze and head tracking data 72 and filter selection, tracking or search light property commands are controlled through voice control commands 90. In other embodiments, a combination of voice, gesture and gaze/head movement controls is provided. For example, searchlight movement commands are controlled based on gaze and head tracking data 72 and voice control commands 90 and gesture control data 82 are used to control different functions selected from searchlight property commands, filter selection command and tracking commands.

Various modes have been described herein including gaze control mode, gesture control mode, head motion control mode, headset control mode and touchscreen control mode. These modes may be selected by voice, gesture or touch control. For example, a gesture may be defined to open a menu of selectable modes that is viewed through headset display 16. In this way, a wearer of the headset 14 can transition between controlling a direction of searchlight 12 by gaze control and touchscreen control. Similarly, position of aerial vehicle 40 can be controlled through gesture control or touchscreen control of interactive map depending on the selected mode. When the modes are not in conflict with each other, some searchlight controls can be controlled by at least two of voice control, gesture control and touchscreen control (e.g. searchlight focus). Similarly, depending on the selected mode, field of view in headset display is controlled by head motion control mode, gesture control mode or touchscreen control mode. The present disclosure thus provides multi-modal control of a searchlight 12, a camera 46 (or at least field of view in headset display 16) and optionally an aerial vehicle 40 through any combination of gesture, voice, gaze, head motion and touchscreen inputs.

In the embodiment of FIG. 1, headset 14, display device 24, processing system 36 and voice recognition unit 30 are shown to be separate from aerial vehicle 40. However, it is envisaged that one or more of these components are located in aerial vehicle 40. In other embodiments, the components are ground based or some are ground based and some are based in the aerial vehicle 40. For example, in the case of an unmanned drone, a ground-based mission coordinator may wear headset 14 and have access to optional touchscreen display device 24 and optional voice recognition unit 30. In other embodiments, a mission coordinator is located on the ground and a pilot is located in the aerial vehicle 40. For example, the mission coordinator may operate display device 24 to change certain functions of the searchlight 12 and to provide a request to the pilot (or the autopilot system 80) in the aerial vehicle 40 to change a location of the aerial vehicle 40 using the interactive map. In yet further embodiments, two mission controllers are located on the ground, one operating the display device 24 and the interactive map and the other wearing the headset 14. The coordinator wearing the headset 14 is able to control a part of the scene being viewed and the direction of the searchlight 12 through head movement and gaze control, whilst the coordinator operating the interactive map is able to control other functions of searchlight and position of the aerial vehicle 40 through the interactive map.

Figure 2:
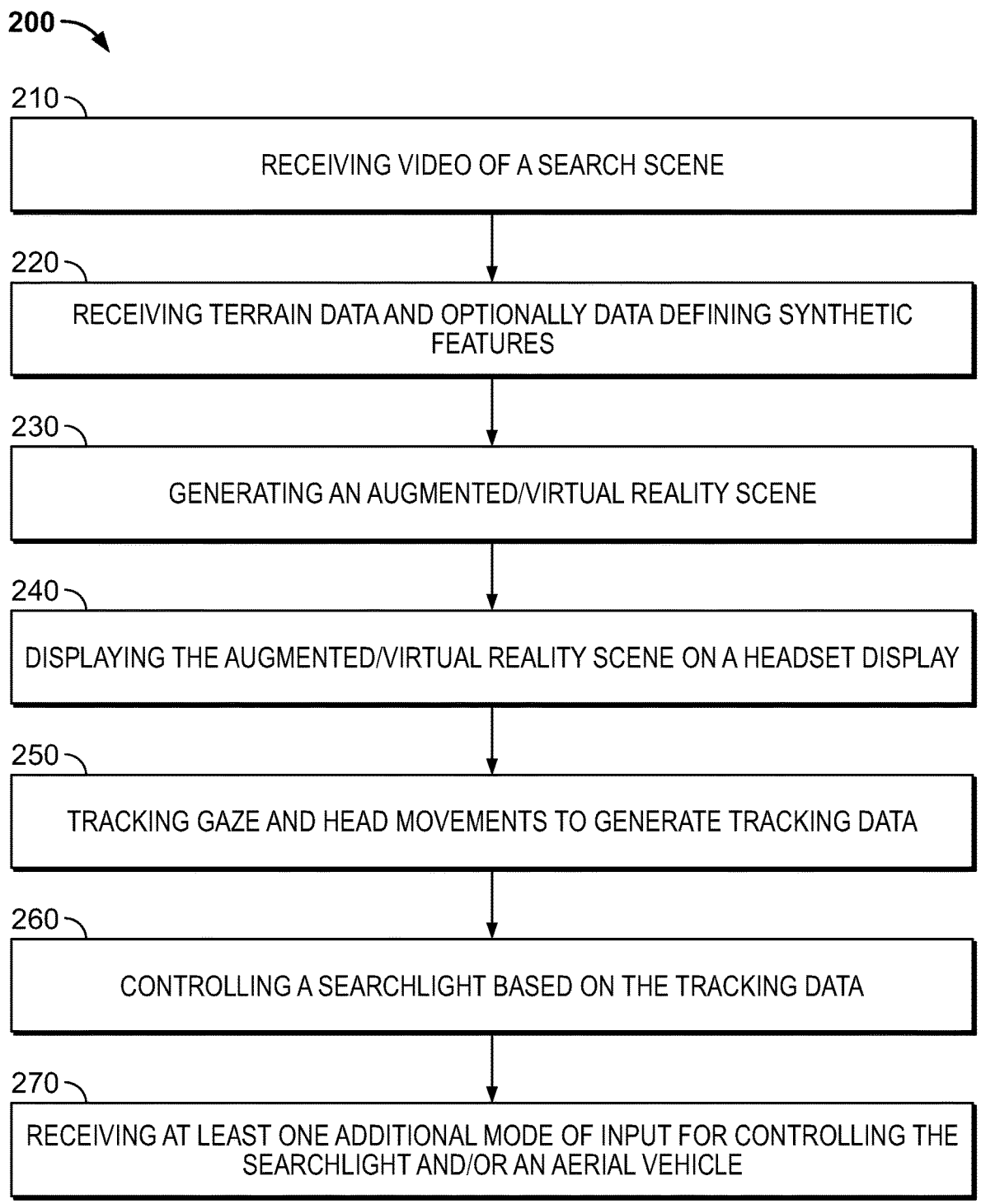
FIG. 2 illustrates a flowchart of a method of operating the searchlight control system of FIG. 1, in accordance with embodiments of the present disclosure.

FIG. 2 illustrates a flowchart of a method 200 of operating a searchlight control system 10, in accordance with various exemplary embodiments. The various tasks performed in connection with method 200 may be performed by software (e.g. program instructions executed by one or more processors), hardware, firmware, or any combination thereof. For illustrative purposes, the following description of method 200 may refer to elements mentioned above in connection with FIG. 1. It should be appreciated that method 200 may include any number of additional or alternative tasks, the tasks shown in FIG. 2 need not be performed in the illustrated order, and method 200 may be incorporated into a more comprehensive procedure or process having additional functionality not described in detail herein. Moreover, one or more of the tasks shown in FIG. 2 could be omitted from an embodiment of the method 200 as long as the intended overall functionality remains intact. Method 200 is described in terms of being performed by one or more processors 48 of processing system 36 executing instruction of computer program 50 stored on non-transitory memory. Processing system 36, processors 48 and computer program may be distributed differently to that shown in FIG. 1 so as to be included in any one or more of headset 14, display device 24, voice recognition unit 30, aerial vehicle 40 or elsewhere.

In step 210, processing system 36 receives video data 56 captured by camera 46 mounted to aerial vehicle 40. Camera 46 is configured to capture video of scene 52, which is lit by searchlight 12 and which potentially includes a target of the search mission (such as a human or vehicular target). In step 220 terrain data 58 defining synthetic terrain features (and their location in the world) is received by processing system 36 in addition to optionally receiving further data defining further synthetic features such as graphical representations of certain objects (e.g. humans or vehicles). In step 230, processing system 36 is configured to generate, via augmented/virtual reality generation module 64, an augmented/virtual reality scene defined by display data 70. Augmented/virtual reality generation module 64 simulates binocular vision by generating different images (included in display data 70) to each eye, giving the illusion that a two-dimensional picture is a three-dimensional environment.

In step 240, the augmented/virtual reality scene defined in display data 70 is displayed through headset display 16. A wearer of headset 14 is able to look up and down, left and right to traverse a view of the augmented/virtual reality scene. Eye (gaze) and head movements are tracked in step 250 by headset gaze camera 20 and headset motion sensors 18 to generate gaze and head tracking data 72, which is fed back to processing system 36 to update a position of a field of view defined by display data 70. The field of view of scene 52 may be changed by augmented/virtual reality generation module 64 sending a different portion of a buffered augmented/virtual reality scene or by adjusting focus and/or aiming of camera 46 by instructing camera controller 46 by sending scene capture data 76. Furthermore, a function of searchlight 12 is controlled based on gaze and head tracking data 72 in step 270. That is, a gaze slaving algorithm is implemented so that an area of interest according to what the eyes of the wearer of headset 14 are looking at in image space is transformed to an area of illumination by searchlight 12 in the real world. Searchlight controller 42 calculates searchlight control data 64 so that searchlight 12 illuminates that area of interest in the real world. In embodiments, the calculation is based on the target real world coordinates, the global position and orientation of the aerial vehicle 40 and searchlight properties (e.g. position on vehicle and current orientation) to determine an angular (and possibly focus) adjustment required to illuminate the target area.

In step 270 at least one additional mode of input is received for controlling the searchlight 12 and/or the aerial vehicle 40. In embodiments, the additional mode of input is gesture control. Gestures of hands of a wearer are detected by gesture determination module 22 processing vision images of a wearer's hands (from an outwardly facing camera of headset 14) or by detecting a constellation of light emitting devices on hand controllers and using a constellation detection algorithm. Gesture determination module 22 outputs gesture control data 82 to output one or more functions of searchlight 12 such as brightness, focus and type of filter being used. Various filters are possible including different color filters and infrared filters (multispectral filters), smoke/fog filters (for optimal use in fog or smoke conditions—generally an amber filter), a peripheral vision filter having a band of light extending around a center spot, etc. Searchlight 12 may include a filter wheel and brightness and/or focus setter that is operated by searchlight actuators 62 under instruction from searchlight controller 42 based on gesture control data 82.

Another mode of input according to step 270, which may be additional to or alternative to gesture control, is voice control. Voice recognition unit 30 detects voice commands in audio data received from microphone 88 (which may be part of headset 14) and generates corresponding machine voice control commands 90 to control a function of searchlight 12. Voice control commands 90 are processed by searchlight controller 42 to output searchlight control data for implementing the commanded function. For example, brightness, focus and filter selection may be controlled by voice control commands 90. Voice control commands 90 may also invoke a tracking function of searchlight controller 42 (and camera controller 46) whereby a target in augmented/virtual reality display scene shown in headset 14 is identified and the target is automatically tracked by searchlight 12 (and camera 46) by way of known tracking algorithms. The target may be identified by a combination of gaze being directed at the target in the augmented/virtual reality display scene paired with a tracking voice command. Processing system 36 is, in such an embodiment, configured to combine identified target in tracking data 72 and tracking command in voice control commands 90 and to send a searchlight tracking invocation command to searchlight and camera controllers 42, 46.

Another mode of input according to step 270, which may be additional to or alternative to gesture and voice control, is touchscreen control whereby searchlight controls (e.g. searchlight movement commands, searchlight property commands, filter selection commands and tracking commands) and/or aerial vehicle controls are selected by a user through display device 24. Display device 24 may be operated by a different search coordinator from headset 14. As such, processing system 36 may include rules to arbitrate control commands of searchlight 12, particularly if any controls from different modes of input are in conflict with one another. Different modes of operation may be set by users to avoid control conflicts such as selecting a gaze control mode or a touchscreen control mode). In embodiments, display device 24 is configured to display an interactive graphical map by interactive map module 26. A user may select an area of interest of interactive map, which is resolved by touchscreen control module 28 into aerial vehicle commands 84. Interactive map will be of such a scale as to encompass a region that is significantly outside of the range of view of camera 46. Interactive map provides a convenient way to command aerial vehicle 40 to fly to the selected area of interest and to illuminate the area of interest with searchlight 12. Interactive map displays a region around aerial vehicle 40 as well as a graphical indicator of current vehicle location, which is based on global position data obtained from sensor system 68. At the same time as displaying interactive map, display device 24 displays live video (or augmented video as described elsewhere herein) of the scene 52, thereby providing an overview of location of a search beam 60 via the interactive map and also the actual area of illumination of the search beam 60 in the video feed. In other embodiments, the interactive map is shown on command by the headset display 16 at the same time as the augmented/virtual reality scene. A command for the interactive map can be selected by a wearer of the headset through gesture or voice control. Further, the interactive map can be selected by the wearer through gesture interactions with the map whereby a pointer or other selection device shown in the virtual world is used to select an area of interest in the interactive map. Alternatively, an area of interest in the virtual interactive map may be selected by gaze detection or by a combination of gaze and voice commands. Headset 14 can respond by issuing aerial vehicle commands to aerial vehicle 40 in the same way as when selections are made on the interactive map through display device 24 (e.g. by transforming image space coordinates to real world coordinates for use by autopilot system 80).

The present disclosure thus allows an intuitive, immersive experience for controlling searchlight and aerial vehicle during a search and rescue mission. Accuracy and speed of control of searchlight control system is significantly enhanced as compared to prior art hand grip controls, allowing the search coordinator to focus wholly on the search task.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A searchlight control system for an aerial vehicle, comprising:
    a searchlight mounted to the aerial vehicle;
    a headset including a headset display and headset sensors;
    a searchlight controller in operable communication with the searchlight, the search light controller configured receive tracking data and to output instructions for controlling at least one function of the searchlight based on the tracking data; and
    at least one processor in operable communication with the headset and the searchlight controller and configured to execute program instructions, wherein the program instructions are configured to cause the at least one processor to:
        receive camera images of a scene including a portion being lit by the searchlight;
        receive terrain data from a terrain database;
        generate an augmented/virtual reality scene based on the camera images and the terrain data;
        command the headset display to display the augmented/virtual reality scene;
        track gaze and head movement using the headset sensors; and
        output the tracking data based on tracked gaze and head movement,
    wherein the at least one function of the searchlight includes one or more of: searchlight movement, searchlight property, filter selection and tracking, wherein searchlight movement includes one or more of position, turn, tilt, move and rotate, searchlight property includes one or more of adjust brightness, focus and slave to camera and tracking includes one or more of track object in focus and record.

2. The searchlight control system of claim 1, wherein a field of view of the augmented/virtual reality scene is adjusted based on the tracking data.

3. The searchlight control system of claim 1, comprising generating camera control commands to adjust a field of view of the camera based on the tracking data.

4. The searchlight control system of claim 1, wherein the at least one processor is configured to execute the program instructions to generate gesture control data based on detected hand gestures of the wearer of the headset and to control at least one feature of the searchlight based on gesture control data.

5. The searchlight control system of claim 1, wherein the at least one processor is configured to execute the program instructions to generate gesture control data based on detected hand gestures of the wearer of the headset and to automatically control a location of the aerial vehicle based on the gesture control data.

6. The searchlight control system of claim 1, wherein the at least one processor is configured to execute the program instructions to receive a user input on an interactive map that is displayed remotely from the aerial vehicle and to adjust a location of the aerial vehicle based thereon.

7. The searchlight control system of claim 1 wherein the at least one processor is configured to execute program instructions to:
    command the headset display to synchronously display the augmented/virtual reality scene and an interactive map;
    receive data representative of interactions with the interactive map; and
    automatically control a position of the aerial vehicle based on the interactions.

8. The searchlight control system of claim 1, wherein the searchlight controller is configured to output instructions for controlling at least one function of the searchlight based on a combination of at least two of the tracking data, gesture control data, voice control data and touchscreen control data.

9. A searchlight control system for an aerial vehicle, comprising:
    a searchlight mounted to the aerial vehicle;
    a headset including a headset display and headset sensors;
    a searchlight controller in operable communication with the searchlight, the search light controller configured receive tracking data and to output instructions for controlling at least one function of the searchlight based on the tracking data; and
    at least one processor in operable communication with the headset and the searchlight controller and configured to execute program instructions, wherein the program instructions are configured to cause the at least one processor to:
        receive camera images of a scene including a portion being lit by the searchlight;
        receive terrain data from a terrain database;
        generate an augmented/virtual reality scene based on the camera images and the terrain data;
        command the headset display to display the augmented/virtual reality scene;
        track gaze and head movement using the headset sensors; and
        output the tracking data based on tracked gaze and head movement,
    wherein the searchlight control system further comprises a voice recognition unit configured to:
        receive audio input including a searchlight control command;
        process the audio input to recognize the searchlight control command using trained vocabulary in a speech recognition module; and
        output controls to the searchlight controller based on the recognized searchlight control command.

10. The searchlight control system of claim 9, wherein the trained vocabulary includes at least one of searchlight movement commands, searchlight property commands, searchlight filter selection commands and tracking commands.

11. A method of operating a searchlight control system for an aerial vehicle, the method comprising:
    receiving, via at least one processor, camera images of a scene including a portion being lit by a searchlight mounted to the aerial vehicle;
    receiving, via the at least one processor, terrain data from a terrain database;
    generating, via the at least one processor, an augmented/virtual reality scene based on the camera images and the terrain data;
    displaying, on a headset display, the augmented/virtual reality scene;
    tracking gaze and head movement using headset sensors;

outputting tracking data based on tracked gaze and head movement;

outputting, via the at least one processor, instructions for controlling at least one function of the searchlight based on the tracking data; and receiving, via the at least one processor, a user input to an interactive map that is displayed remotely from the aerial vehicle and automatically adjusting, via the at least one processor, a location of the aerial vehicle based thereon.

12. The method of claim 11, wherein a field of view of the augmented/virtual reality scene is adjusted based on the tracking data.

13. The method of claim 11, comprising generating, via the at least one processor, gesture control data based on detected hand gestures of the wearer of the headset and controlling, via the at least one processor, at least one feature of the searchlight based on gesture control data.

14. The method of claim 13 comprising automatically controlling, via the at least one processor, a location of the aerial vehicle based on the gesture control data.

15. The method of claim 11, wherein the at least one function of the searchlight includes one or more of: searchlight movement, searchlight property, filter selection and tracking, wherein searchlight movement includes one or more of position, turn, tilt, move and rotate, searchlight property includes one or more of adjust brightness, focus and slave to camera and tracking commands includes one or more of track object in focus and record.

16. The method of claim 11, comprising:
synchronously displaying, on the headset display, the augmented/virtual reality scene and an interactive map;

receiving, via the at least one processor, user interactions with the interactive map; and automatically controlling, via the at least one processor, a position of the aerial vehicle based on the interactions.

17. The method of claim 11, comprising:
receiving, the at least one processor, audio input including a searchlight control command;

processing, via the at least one processor, the audio input to recognize the searchlight control command using trained vocabulary in a speech recognition module; and outputting, via the at least one processor, controls to the searchlight controller based on the recognized searchlight control command.

18. The method of claim 11, comprising outputting instructions, via the at least one processor, for controlling at least one function of the searchlight based on a combination of the tracking data and at least one of: gesture control data, voice control data and touchscreen control data.

* * * * *